United States Patent
Becker et al.

(10) Patent No.: US 7,064,657 B2
(45) Date of Patent: Jun. 20, 2006

(54) METHOD AND SYSTEM FOR ACCESSING AND VIEWING IMAGES OF A VEHICLE INTERIOR

(75) Inventors: Craig Henry Becker, Austin, TX (US); Jimmy Ming-Der Hsu, Austin, TX (US); Peter Y. Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 10/753,822

(22) Filed: Jan. 8, 2004

(65) Prior Publication Data
US 2005/0151628 A1 Jul. 14, 2005

(51) Int. Cl.
*B60R 25/10* (2006.01)

(52) U.S. Cl. .................. 340/426.1; 340/937; 340/521; 340/825.36; 348/148; 348/152

(58) Field of Classification Search ............ 340/937, 340/517, 521, 541, 426.1, 506, 426.4, 426.2, 340/426.28, 825.36; 348/148, 143, 152–154
See application file for complete search history.

(56) References Cited

U.S. PATENT DOCUMENTS

| | | | |
|---|---|---|---|
| 5,027,104 A | 6/1991 | Reid | 340/541 |
| 5,081,667 A * | 1/1992 | Drori et al. | 455/404.1 |
| 5,276,728 A * | 1/1994 | Pagliaroli et al. | 455/404.1 |
| 5,680,123 A | 10/1997 | Lee | 340/937 |
| 6,002,326 A | 12/1999 | Turner | 340/426 |
| 6,009,320 A | 12/1999 | Dudley | 455/404 |
| 6,127,924 A * | 10/2000 | Hung | 340/7.1 |
| 6,246,315 B1 | 6/2001 | Thomas et al. | 340/426 |
| 6,278,884 B1 * | 8/2001 | Kim | 455/556.1 |
| 6,323,762 B1 | 11/2001 | Ekpo, Jr. | 340/426 |
| 6,335,679 B1 * | 1/2002 | Thomas et al. | 340/426.13 |
| 6,525,653 B1 * | 2/2003 | Rigmaiden | 340/426.1 |
| 6,717,511 B1 * | 4/2004 | Parker et al. | 340/426.12 |
| 2002/0067248 A1 * | 6/2002 | Howells | 340/426 |
| 2003/0041329 A1 * | 2/2003 | Bassett | 348/148 |
| 2004/0066452 A1 * | 4/2004 | Gauthier | 348/148 |

FOREIGN PATENT DOCUMENTS

| | | |
|---|---|---|
| DE | 19712220 A1 | 9/1997 |
| WO | WO 97/36771 | 10/1997 |

\* cited by examiner

*Primary Examiner*—Jeffery Hofsass
*Assistant Examiner*—Daniel Previl
(74) *Attorney, Agent, or Firm*—Duke W. Yee; Jeffrey S. LaBaw; Wayne P. Bailey

(57) ABSTRACT

An alarm system and method by which a user can be alerted to a detected condition regarding their vehicle, can view what is happening in and around the vehicle, and can remotely turn off or reset the alarm if it is determined that an alarm is false. This is provided using one or more cameras and a cellular telephone to which the pictures can be sent.

19 Claims, 2 Drawing Sheets

METHOD AND SYSTEM FOR ACCESSING AND VIEWING IMAGES OF A VEHICLE INTERIOR

BACKGROUND OF THE INVENTION

1. Technical Field

This application relates to vehicle security, with regards especially to both the prevention of false alarms and decreased response time to actual alarms. More specifically, the application relates to the combined use of on-board cameras and cellular telephones to allow the owner of a vehicle to (a) be alerted when an alarm is triggered, (b) view the vehicle interior and/or immediate area, and (c) respond by either turning off the alarm or calling the police.

2. Description of Related Art

Vehicle theft is widespread and can cause the loss of a sizeable investment to a user. The most common type of vehicle protection system uses an alarm that goes off when a thief attempts to open the vehicle. Unfortunately, these alarms can often be triggered unintentionally, such as when a person or another vehicle bumps the armed vehicle. Even strong vibrations, such as from a nearby clap of thunder during a storm, or a 21-gun salute during the funeral of an ex-President, can set off a false alarm.

Many additional types of vehicle alarms have been suggested. For example, U.S. Pat. No. 5,081,667 to Drori et al. discloses integrating a cellular phone installed in a vehicle with the vehicle security system, such that after integration, the user can start or monitor the engine from any phone, can program in a phone number at which the user can be reached in case of intrusion into the vehicle, or can initiate listening or two-way conversations with the intruder.

U.S. patent application Ser. No. 2002/0096132 to Parker Jr. et al. discloses an embedded pager or cell phone carried as part of a vehicle security system. In one embodiment, an intrusion causes a camera on the dashboard of the vehicle to take a picture of the driver, which can then be forwarded to the user's cell phone.

U.S. Pat. No. 5,027,104 to Reid utilizes a number of hidden cameras in various positions around a vehicle. The security device can send an alarm to the owner, using a given frequency, when an intrusion is detected, and one embodiment can then send a video signal from the cameras to a hand-held monitor in the user's possession.

While these inventions are aimed at apprehending an auto thief, they do not take into consideration the nuisance factor of false alarms, nor do they enable a response to such a false alarm. Therefore, it would be desirable to have an easy means for a user to be notified when their car alarm goes off and to not only be able to distinguish between a theft-in-progress and a false alarm, but to be able to turn off the alarm remotely for a false alarm.

SUMMARY OF THE INVENTION

The present invention provides a device and method by which a user can be alerted to a detected condition regarding their vehicle, can view what is happening in and around the vehicle, and can remotely turn off or reset an alarm if it is determined that the alarm is false. Additionally, provision is made for contacting the police or other authorities if a theft is actually in progress. All this is provided using any cellular telephone, a device that is fast becoming ubiquitous in much of the world.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Equipment

Figure 1:
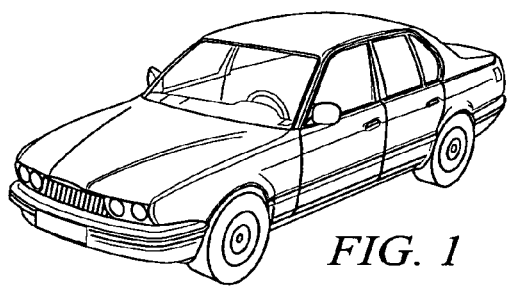
FIG. 1 depicts an automobile in which the present invention can be implemented according to an exemplary embodiment of the invention.

With reference to the figures, an embodiment of the invention will be discussed. FIG. 1 discloses an automobile that can be equipped with a security system according to an embodiment of the invention. In this embodiment, the security system is preferably factory installed while the vehicle is being built, although it can also be installed as an aftermarket security system.

Figure 2:
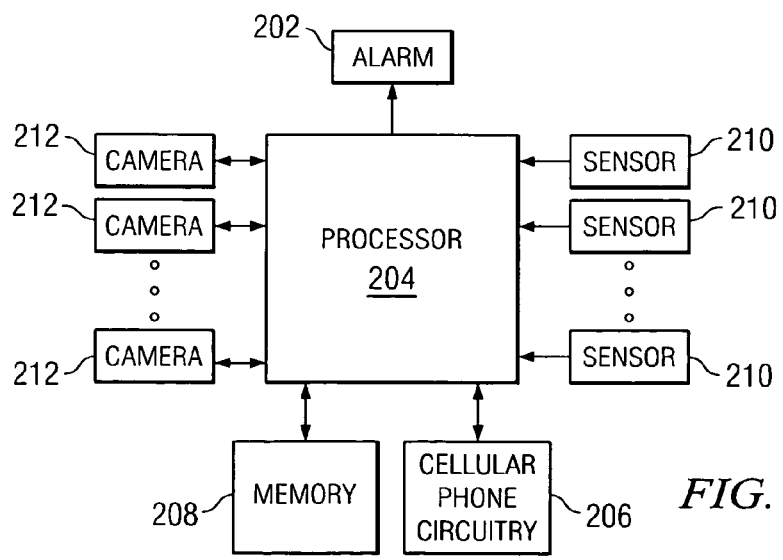
FIG. 2 diagrammatically depicts the components of an alarm system according to an exemplary embodiment of the invention.

The components of the innovative alarm system are shown diagrammatically in FIG. 2. This system 200 comprises sensors 210 to detect an intrusion, a local alarm 202, one or more cameras 212, a processor 204, memory 208, and cellular phone circuitry 206. Preferably, as many as possible of these components are placed in locations that are difficult for a thief to reach and disconnect, such as under the hood of the vehicle. The cameras 212 are placed so that they can be used to view the interior and immediately adjacent exterior of the vehicle. As recent technology has made substantial progress in the miniaturization of cameras, there are many possible locations for the placement of cameras. At least one camera 212 is preferably placed so that it can view the driver's seat and at least a portion of the window on the driver's side of the vehicle, since these are the locations where one is most likely to see an intruder. Other cameras 212 can be placed to afford a view out any of the windows or to provide other views of the interior of the vehicle. These are preferably digital cameras, although they can take either still shots or videos. The camera installations can be fixed, or they can have some degree of rotation, so that they can pan across the field of view. Alternatively the cameras can contain a wide-angle lens to enable a view of a larger field.

The sensors 210 used to detect intrusion can be any type of sensor. Most commonly, these would be motion detectors or sensors for a door opening while the alarm is set, but the sensors can include any type, such as glass break, attempted opening of the hood, etc. A processor 204, connected to a memory 208, is also connected to receive input from the sensors 210 and to control the alarm 202, the cameras 212, and the cellular phone circuitry 206.

Figure 3:
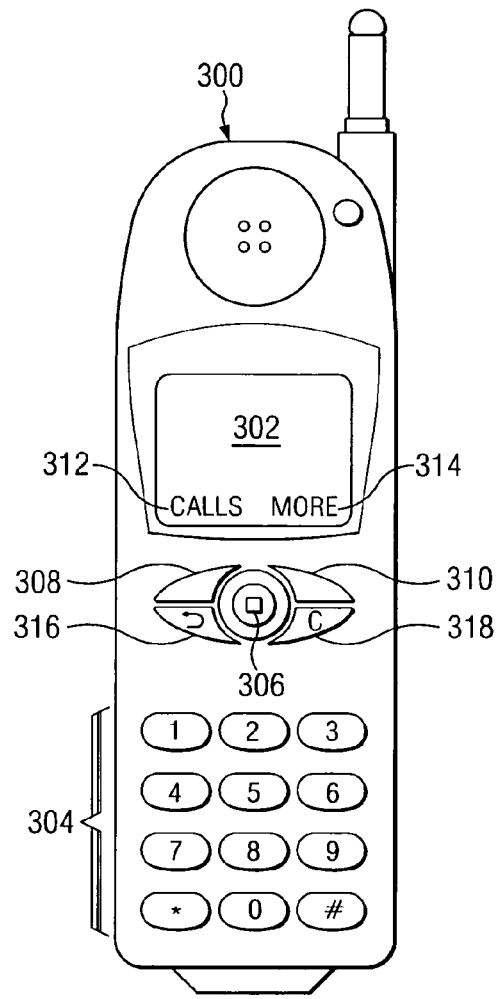
FIG. 3 depicts a cellular phone that can be used to implement the present invention according to an exemplary embodiment of the invention.

In additional to the cellular phone circuitry 206 in the vehicle 100, the user can utilize their own mobile phone to program the system and to be contacted by the system when the alarm is triggered. Preferably, the user's mobile phone is small enough that it can be carried in a pocket and contains a screen large enough for viewing pictures from the cameras placed within the vehicle. FIG. 3 demonstrates an exemplary mobile telephone for use with the inventive system, according to one embodiment of the invention. This figure demonstrates a model 610 available from Sony Ericsson. This mobile phone 300 will fit into a pocket, yet almost half of its front surface is a screen 302 capable of viewing pictures. Additionally, there is a standard numeric keypad 304, a joystick 306, and four buttons placed around the joystick.

Operation

Figure 4:
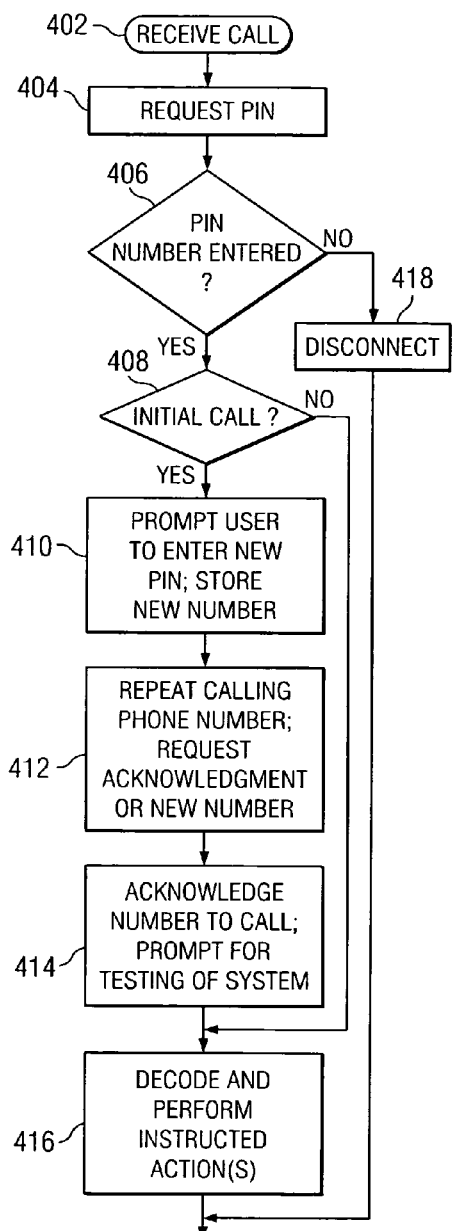
FIG. 4 depicts a flowchart of a user contacting the innovative security system according to an exemplary embodiment of the invention.
Figure 5:
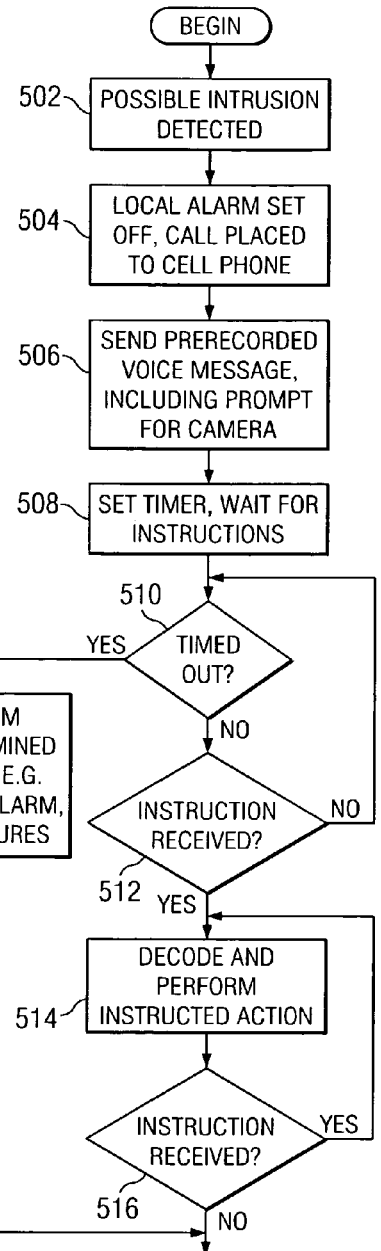
FIG. 5 depicts a flowchart of the innovative security system contacting the user according to an exemplary embodiment of the invention.

Because the innovative system uses cellular phone circuitry for communications, there are two general operation flows, illustrated in FIGS. 4 and 5. FIG. 4 demonstrates the activity when the user initiates a call to the embedded phone, while FIG. 5 demonstrates the flow when the system initiates the contact.

In FIG. 4, this flowchart will initially be entered for setting up the system. The cellular phone circuitry 206 of the alarm system will have a telephone number. The user can therefore call this number once the innovative alarm system has been installed in a vehicle and be connected to the security system. The innovative system receives this call (step 402). The security system uses a personal identification number (PIN) or similar means of identification to deny access to malicious or stray calls. Thus, initially, the system will play a recorded message requesting a PIN number (step 404). For new customers, this can be set to an easily remembered code, such as "1234". The user enters this number using the keypad of their telephone. If the PIN is correctly entered (step 408), the caller is acknowledged and allowed to continue; otherwise the caller will be disconnected (step 418). If this is the first time the user has called, the system will prompt the user to enter a new PIN code (step 410), i.e., one not so commonly used. This new PIN will be stored in memory 208 for future use. The system then prompts the user to enter the phone number at which they wish to be contacted (step 412). With caller recognition technology, the system can accomplish this by prompting the user with the number from which they are calling, offering a prompt to push "1" if this is the number to be contacted for intrusions or "2" to provide another number. After the phone number is received and stored, the user can be prompted to accustom himself with control of the system (step 414). For example, once the phone number has been accepted, the system can play a message, such as, "The emergency contact number is (999) 555–1212. To activate camera 1, press "1"; to activate camera 2, press "2"; etc.".

Depending on the commands entered, the system can decode the command and respond (step 416) appropriately to any number of commands. For example, the system can be commanded to activate a camera and transmit its picture, to scan the area using one or more cameras. These commands can be entered into the numeric keypad. For example, once a camera is activated, the system can display the view from that camera with a message to use keypad numbers "2", "4", "6", and "8" to move the camera "up", "left", "right", or "down". All images, whether still or moving, are transferred digitally to the user via the phone connection. Additionally, the user can set the alarm, turn off the alarm, send a history, change PIN number, change phone number to call, etc. In future accesses, once the correct PIN is received, the system will skip the initialization process and go straight to other commands (step 416).

In contrast to FIG. 4, the flowchart of FIG. 5 is entered at the initiation of the alarm system. The sensors, which have been monitoring the activity in and around the automobile, detect a condition (step 502), such as movement of the car or the opening of a door while the alarm is set, that can indicate an intrusion. The innovative alarm system will not only set off a localized alarm, but will also call (step 504) the contact number that has been programmed into the system, such as the user's cellular telephone. Although many cellular telephone systems now have call waiting, it is possible that the alarm system will not be able to reach the user, but will be shunted to voice mail, such as when the user is in an area with poor reception or has left the phone elsewhere. The alarm system cannot determine whether a live respondent or a recorded message answers the call. Therefore, the alarm system can play a pre-recorded message and/or send a pre-set text message (step 506), such as, "Your car alarm is going off. Do you wish to view the scene?" Once this message has been sent, the alarm sets a timer, e.g., for thirty seconds or a minute, and waits for a response (step 508). The alarm system will than loop in place until either the timer times out ("yes" to step 510) or an instruction is received ("yes" to step 512).

Presuming that an instruction is received first, the system can decode these instruction as programmed and act on them (step 514), with or without providing prompts to the user. As each instruction is performed, the system can check for further instructions (step 516) and continue as long as instructions are received. In one embodiment, the user is prompted to view the vehicle; if no suggestion of intrusion is found, the user can remotely turn off the alarm. Alternatively, if the user detects a problem, such as a thief or accident, the user can enter instructions to deal with the problem, such as calling the police, saving incriminating pictures, or even transmitting the pictures to the police.

Backing up to step 510, if the alarm system times out, the call must have been taken by the voice mail system. Since a voice/text message has already been left on the user's phone, the alarm system can perform a predetermined set of steps (step 518) and exit. For example, the user can set the system so that one or more cameras are activated for a short period of time to take a pre-set number of photos of the vehicle (such as the driver's seat, out the driver's window, and out the front windshield), then turn off the alarm. When the user is able to retrieve the message, the user can call the system (see FIG. 4) and retrieve any saved information.

In an alternate embodiment, sensors can be provided to alert the owner of conditions other than attempted theft. For example, the system can have sensors that are active even when an alarm is not set, such as sensors to detect an airbag being deployed or to detect damage to the vehicle that might indicate an accident. Other sensors can include drug or alcohol detectors in the interior of the vehicle. Each type of detector can have its own hierarchy of actions to perform. For example, the system can be programmed to call the owner when someone tries to open the car door, but to contact a spouse if an airbag is set off. The types and sensitivities of the sensors available are the only limits to the possibilities of such a system.

In an alternate embodiment, the innovative alarm system can be programmed to provide a number of responses. For example, when the alarm system contacts the user, it may be set to turn on all cameras and to create a composite picture showing small views from various cameras for immediate display. The user can then assess the situation quickly and request larger views from individual cameras, pan the view, etc. In addition to turning off the alarm, the system can reset the alarm, disable the engine, or provide additional response mechanisms.

In further alternate embodiments, the alarm system can have a hierarchy of numbers to call. If the first call does not reach a live respondent, the system can call other numbers, e.g., a user's spouse or an alarm monitoring company, until a live respondent is reached or the list is exhausted.

It is important to note that while the present invention has been described in the context of a fully functioning alarm system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling vehicle systems comprising the steps of:
    responsive to an alarm coupled to a vehicle, sending a first signal to a remote user device;
    after sending the first signal to the remote user device, and responsive to a first input received from the remote user device, remotely activating a camera situated inside the vehicle so that a current image of the vehicle interior is sent to the remote user device; and
    responsive to a second input by the remote user device, deactivating the alarm, wherein signals between the remote user device and the vehicle are sent via a cellular network.

2. A method for controlling vehicle systems comprising the steps of:
    responsive to an alarm coupled to a vehicle, sending a first signal to a remote user device;
    after sending the first signal to the remote user device, and responsive to a first input received from the remote user device, remotely activating a camera situated inside the vehicle so that a current image of the vehicle interior is sent to the remote user device;
    responsive to a second input by the remote user device, deactivating the alarm; and
    responsive to no input being received from the remote user device within a given amount of time from said signal being sent, sending a second signal to a proxy remote device which is remote from the vehicle.

3. A vehicular control system comprising:
    a processor, an alarm, and a sensor, affixed to a vehicle and coupled to each other such that detection of a given condition by said sensor causes said alarm to sound;
    a camera attached to said vehicle, said camera being attached to said processor;
    a memory for staring a plurality of cellular telephone numbers and a set of conditions under which each of said plurality of cellular telephone numbers is to be contacted; and
    cellular telephone circuitry coupled to said processor;
        wherein said camera and said alarm can be remotely controlled through said cellular telephone circuitry.

4. The system of claim 3, wherein the vehicle can be disabled via said cellular telephone circuitry.

5. The system of claim 3, wherein a user interacts with said vehicular control system via a cellular telephone.

6. A method for controlling a vehicle system comprising the steps of:
    responsive to a first condition detected by a first sensor in a vehicle, making a first connection to a first cellular phone, sending a first signal to said first cellular phone, and providing control of a camera located in said vehicle to a first user of said first cellular phone;
    responsive to a second condition, making a second connection to a second cellular phone, sending a second signal to said second cellular phone and providing control of said camera located in said vehicle to a second user of said second cellular phone; and
    sending a current image of at least a portion of the vehicle to the second cellular phone.

7. The method of claim 6, wherein the first condition and the second condition are maintained in a memory contained within the vehicle system.

8. The method of claim 6, wherein one of said sensors detects an open door.

9. The method of claim 6, wherein one of said sensors detects airbag deployment.

10. The method of claim 6, wherein one of said sensors detects alcohol or drugs in the interior of said vehicle.

11. The method of claim 6, wherein said first cellular phone and said second cellular phone have different phone numbers.

12. The method of claim 6, further comprising the step of:
    responsive to receiving a phone call in which a predetermined password is presented, providing control of said camera during the duration of said phone call to a person making said phone call.

13. The method of claim 6, further comprising the step of:
    responsive to receiving a phone call in which a predetermined password is presented, prompting a person making said phone call to change a phone number assigned to said first cellular phone and to said second cellular phone.

14. A vehicular control system comprising:
    a processor attached to a vehicle;
    first and second sensors, affixed to said vehicle and coupled to said processor;
    a camera attached to said vehicle, said camera being connected to said processor;
    a cellular telephone connection connected to said processor;
    first instructions, executable by said processor, for calling a first telephone number when said first sensor detects a first specific condition; and second instructions, executable by said processor, for calling a second telephone number when said second sensor detects a second specific condition;

wherein the a person answering said first telephone number or said second telephone number can remotely control said camera through said cellular telephone connection to take an image of at least a portion of the vehicle and to send the image using said cellular telephone connection to the person answering said first telephone number or said second telephone number.

15. The vehicular control system of claim 14, wherein the first condition, the second condition, the first telephone number and the second telephone number are maintained in a memory connected to the processor.

16. The vehicular control system of claim 15, further comprising fourth instructions, executed by said processor after receiving a phone call in which a password is presented, for modifying said first phone number, and said second phone number in the memory.

17. The vehicular control system of claim 14, wherein one of said first and said second sensors detects motion of said vehicle.

18. The vehicular control system of claim 14, wherein one of said first and said second sensors detects an airbag deploying.

19. The vehicular control system of claim 14, further comprising third instructions, executed when a user does not respond to said call to said first phone number, for calling a third phone number.

* * * * *